F. DU MOND.
ANTISIPHON TRAP.
APPLICATION FILED MAY 17, 1912.
1,050,527.
Patented Jan. 14, 1913.
2 SHEETS—SHEET 1.
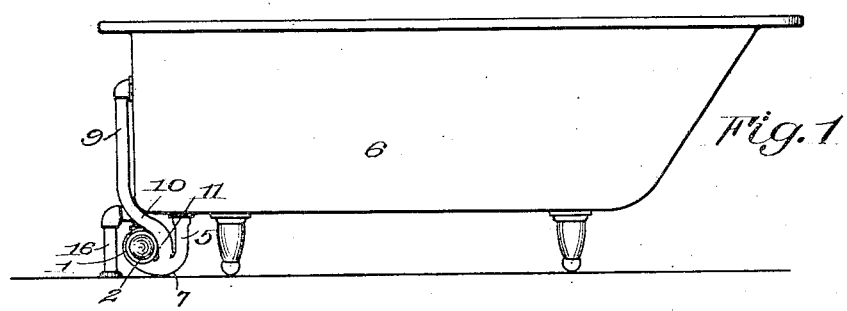
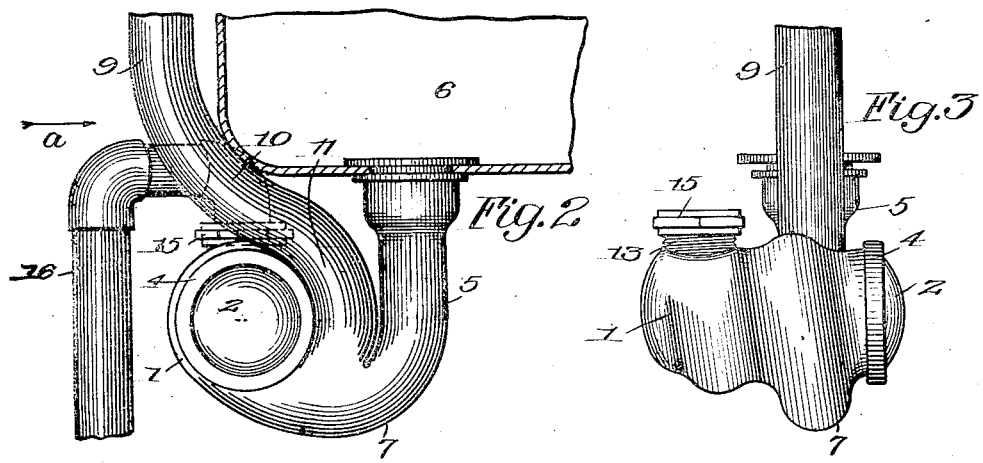
Witnesses
Ada M. Whitmore
L. M. Simms
Inventor
Frank Du Mond
By H. H. Simms
his Attorney F. DU MOND.
ANTISIPHON TRAP.
APPLICATION FILED MAY 17, 1912.
1,050,527.
Patented Jan. 14, 1913.
2 SHEETS—SHEET 2.
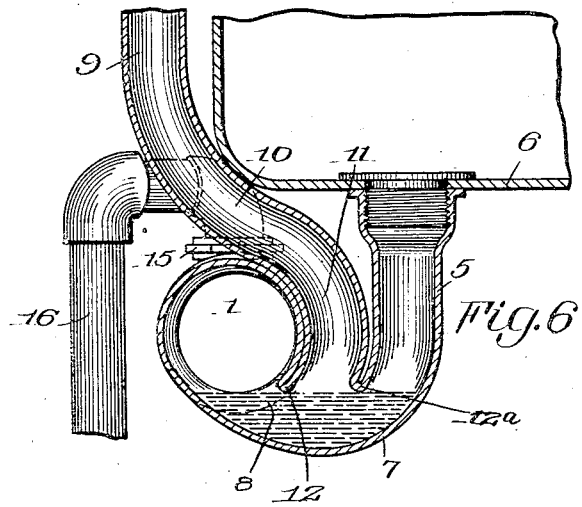
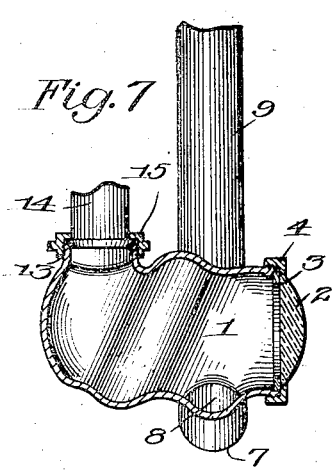
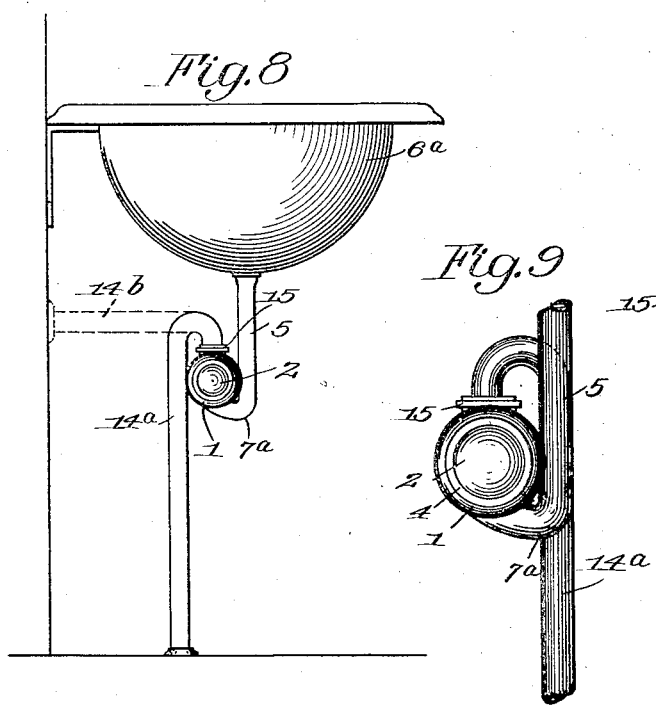
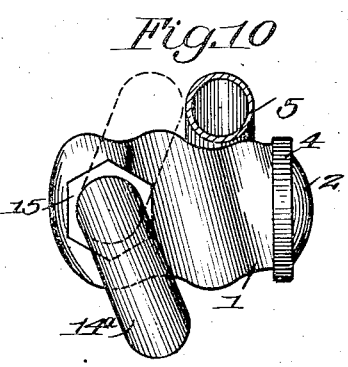
Witnesses
Ada M. Whitmore.
L. M. Simms.
Inventor
Frank Du Mond
By H. H. Simms
his Attorney

ID.

UNITED STATES PATENT OFFICE.

FRANK DU MOND, OF ROCHESTER, NEW YORK.

ANTISIPHON-TRAP.

1,050,527.  Specification of Letters Patent.  Patented Jan. 14, 1913.

Application filed May 17, 1912. Serial No. 697,832.

*To all whom it may concern:*

Be it known that I, FRANK DU MOND, of Rochester, in the county of Monroe and State of New York, have invented a new and useful Improvement in Antisiphon-Traps, which improvement is fully set forth in the following specification and shown in the accompanying drawings.

The present invention relates to anti-siphon traps and an object of the same is to provide a trap which is of the most approved sanitary construction, is inexpensive to manufacture and will effectively prevent siphoning under any condition which will arise during the use thereof.

To these and other ends the invention consists in certain parts and combination of parts all of which will be hereinafter described, the novel features being pointed out in the appended claims.

In the drawings: Figure 1 is a side view of the bath tub to which the invention is applied; Fig. 2 is an enlarged view of the trap from the clean out end thereof; Fig. 3 is a side view of the trap with the outlet pipe removed and looking in the direction of the arrow *a* Fig. 2; Figs. 4 and 5 are respectively a top and a bottom view of the trap; Fig. 6 is a section on the line *b—b* Fig. 4; Fig. 7 is a section on the line *c—c* Fig. 5, the inlet pipe being removed; Fig. 8 illustrates a modification of the trap adapted for use with basins or sinks, the dotted lines showing the manner of arranging the outlet pipe different from that shown in full lines; Fig. 9 shows the outlet pipe arranged in another manner; Fig. 10 is a top view of the modification shown in Figs. 8 and 9, the outlet pipe being shown in full lines, as illustrated in full lines in Fig. 8, and, in the dotted lines showing the outlet pipe as in the position shown in Fig. 9.

According to this invention there is provided a body or bulb 1 which is elongated horizontally and has a clean out at one end consisting in this instance of a lens or transparent portion 2 held against the packing ring 3 by a clamping ring 4. This body has an inlet pipe or connection connected thereto which consists of a vertical portion 5 attached in any suitable manner as to a bath tub 6, said inlet being provided with a curved portion 7 which bends below the plane of the lowermost portion of the bulb and enters the latter on a tangent to the horizontal axis of the bulb or body near one end of the latter, in this instance, the clean out end. The curved portion 7 serves to contain the water seal which is formed as shown in Fig. 6. Also connecting with the inlet of the trap is the overflow pipe or connection which leads vertically at 9 from the upper portion of the bath tub and bends laterally at 10 over the body 1 and thence downwardly at 11 connecting with the inlet between the vertical portion 5 thereof and the inlet opening 8, the proximate walls of the overflow pipe and the bulb lying in close engagement so as to reduce the size of the trap to a minimum and forming a lip 12 which serves as a sealing lip or point for the trap. The walls of the overflow connection and the inlet connection may form a lip $12^a$ which extends at least to the water seal shown in Fig. 6 and serves as a means for separating these connections above the seal to prevent a circulation through them, a result which is very desirable as a circulation of air through these connections after the overflow has become fouled is very disagreeable.

The outlet of the trap is located at the end of the body opposite the inlet, and, in the embodiment shown in Figs. 1 to 7, comprises an externally threaded nipple 13 projecting upwardly from the top of the body and having the outlet pipe 14 secured thereto by a clamping ring 15, said outlet pipe consisting of a return bend which permits the vertical portion 16 thereof to be thrown into the plane of the overthrow pipe and the inlet as shown in Fig. 4 so that the trap may be roughed in like the ordinary commercial connected waste and overflow. As the water enters the trap body on a tangent at one end thereof and passes out of the top of the trap at the other end thereof, it is caused to travel in a spiral path from the inlet to the outlet about a horizontal axis. This action is facilitated by forming an internal spiral groove which merges into the inlet at one end and connects with the outlet at the other end.

In the embodiment of the invention shown in Figs. 8 and 9, the body 1 of the trap is substantially the same as that shown in Figs. 1 to 7. The inlet 5 connects with the basin or link $6^a$ and bends laterally at $7^a$ below the body 1 to enter the said body tangentially. The overflow pipe is omitted so that the pipe 5 lies in close proximity to the bulb or body 1. The outlet pipe $14^a$ connects with the body at the same point that it does in Figs. 1 to 7. It may consist of the horizontal pipe as shown at 14ᵇ, Fig. 8, or a vertical pipe as shown at 14ᵃ, Figs. 8 and 9. The latter construction has a return bend and the connection 15 permits the outlet pipe to be positioned on either side of the body.

A trap constructed in accordance with this invention is not provided with any lips or projections to obstruct the free flow of water. The inlet and the outlet are of the same size so that there is no choking within the trap, and no air space is provided so that the fouling of the trap is impossible. The clean out is located below the water line and all of the interior walls are cleaned or scoured with every discharge.

The trap has very small vertical height and by reason of the fact that the inlet and the outlet are located at opposite ends of the elongated body, out of alinement with each other, there is obtained a very great resistance to siphoning.

The trap has special advantages when used with bath tubs as it may be located entirely above the floor and beneath the tub, its outlet and overflow connecting thereto in such a manner that the usual roughing in now done by plumbers for connecting with the bath tub is the same, thus not adding to the cost of installing the trap.

What I claim as my invention and desire to secure by Letters Patent is:

1. An anti-siphon trap comprising a body elongated horizontally and substantially of uniform width throughout its length and having an inlet leading into the bottom thereof near one end on a tangent to the body, said inlet extending from a point above the body and making a lateral and upward bend prior to connecting with the body so as to provide a seal therein; and an outlet leading through the outer wall of the body at the opposite end thereof.

2. An anti-siphon trap comprising a body elongated horizontally and provided with an internal groove leading from one end of the trap to the other, an inlet extending from a point above the body, making a lateral and upward bend prior to connecting with the body so as to provide a seal in said bend, the inner end of said inlet merging into the spiral groove at the bottom of the body near one end of the latter and on a tangent to said body, and an outlet leading through the top of the inclosing wall of the body near the opposite end, whereby the material is caused to flow in a spiral path about a horizontal axis from the inlet to the outlet.

3. An anti-siphon trap comprising a body elongated horizontally and provided with an inlet leading to one end of the body on a tangent, and an outlet leading from the body near the other end, said body being provided with an internal spiral groove leading from the inlet to the outlet.

4. An anti-siphon trap comprising an elongated body provided with an internal spiral groove leading from one end of the trap to the other, an outlet at the top of the body, and an inlet pipe provided with a lateral and upward bend, said inlet pipe connecting with the bottom of the trap and having its inner end merging into the spiral groove.

5. An anti-siphon trap comprising a body elongated horizontally, a vertically arranged inlet bending laterally, thence upwardly and entering the bottom of the body near one end on a tangent to the body to provide a seal below said body, a vertically arranged overflow bending laterally over the body, thence downwardly and connecting with the inlet between the body and the vertical portion of the inlet, and an outlet leading from the top of the body at the end opposite the inlet.

6. An anti-siphon trap elongated horizontally, a vertical inlet pipe extending from a point above the body, bending laterally, thence upwardly and entering the bottom of the trap near one end, on a tangent to the body, to provide a seal in the inlet pipe below the trap body, and an overflow pipe connecting with the inlet pipe between the body and the vertical portion of the inlet, both walls of said overflow extending at least to the seal in the inlet pipe, and an outlet leading through the inclosing wall of the body at the end opposite to the inlet.

FRANK DU MOND.

Witnesses:
 HAROLD H. SIMMS,
 ADA M. WHITMORE.